Patented July 7, 1931

1,813,609

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

DETERIORATION INHIBITOR FOR RUBBER

No Drawing.   Application filed May 29, 1930. Serial No. 457,495.

This invention relates to the manufacture of rubber and rubber-like compounds and it has particular relation to the manufacture of compounds of that character which are exposed to the effects of light, heat and oxygen.

The object of the invention is to provide a rubber compound which offers particularly high resistance to the above indicated weathering agencies whereby to preserve the material and to extend the period of usefulness thereof.

Heretofore, it has been observed that rubber and rubber-like materials such as balata or gutta percha upon exposure to light, air or heat either alone or in combination, tended quickly to harden and lose their tensile strength and elasticity and thereby becomes unfit for further service. It has been proposed to overcome or to retard these effects by incorporating into the compounds certain organic materials termed "antioxidants" or age retarders which tended to prevent the action of the ordinary weathering agencies.
Numerous materials have been proposed for this purpose among which are diphenylamine, hydroquinone and certain reaction products of aldehydes and aromatic amines such as aldol and alpha naphthylamine.
However, most of the substances heretofore proposed as antioxidants have been objectionable for various reasons. Some of them were so expensive as to be impracticable for commercial use. Others were objectionable because of their tarry or pitchy nature which rendered it difficult successfully to handle them and incorporate them into rubber. Still others were characterized by strong and disagreeable or even poisonous odors which necessitated special precautions in the ventilation in the plants in which they were employed.

This invention involves the discovery that naphthyl substituted benzidine compounds, particularly mono naphthyl and di-naphthyl substituted benzidines were highly efficient as preservatives and greatly extend the period of utility of the rubber materials in which they are employed. Naphthyl benzidine of either the alpha or beta forms, may readily be prepared by subjecting benzidine and the naphthol to a temperature of 280° to 300° C. in an autoclave for a period of 8 to 10 hours. The reaction product consists of two components, one being the mono substituted naphthylene and the other being the disubstituted material. The formulæ of these materials are respectively as follows:

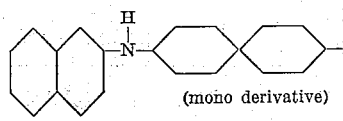
(mono derivative)

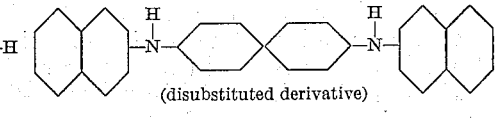
(disubstituted derivative)

While only the beta derivatives of benzidine have been indicated in the formula, it is of course to be understood that analogous methods may be employed in the manufacture of the alpha substituted material for use as antioxidants. Also, it is possible to form mixed alpha and beta substituted compounds by employing suitable conditions for the reaction. The naphthyl benzidines may be obtained in a state of sufficient purity for ordinary technical use merely by treating the crude reaction product with sodium hydroxide (5 percent concentration) and following this treatment with thorough washing with water. If a purer grade of material is desired, the material obtained, as described above, may be repeatedly recrystallized from a mixture of alcohol and aniline. The compound so obtained should further be extracted with boiling xylene in order to separate the mono naphthyl derivative of the benzidine from the disubstituted material. The mono substituted material is crystallized from the xylene in comparatively pure form. The disubstituted benzidine is left as a residue from the extraction of the boiling xylene and has a melting point of 236° to 238° C.

The invention is not limited to the naphthyl substituted benzidines but also includes naphthyl substituted tolidines or even corresponding xylidines. However, the latter materials are less practicable from a commercial viewpoint because of the expense involved in their preparation.

The above described naphthyl substituted benzidines may be employed as antioxidants in most of the standard rubber compounds. However, the following are specific examples of such formulæ in which they have been found by actual test to give excellent results.

*Compound A*

| | Parts |
|---|---|
| Rubber | 100 |
| Sulfur | 3 |
| Hexymethylene tetramine | 1 |
| Zinc oxide | 5 |
| Stearic acid | 1.5 |
| Antioxidant | 1 |

*Compound B*

| | |
|---|---|
| Smoked sheet | 100 |
| Carbon black | .6 |
| Zinc oxide | 92.6 |
| Sulfur | 3.5 |
| Diphenylguanidine | .7 |
| Antioxidant | 5 |

Two sets of samples were prepared from each of these two types of stock. These samples were then subjected to vulcanization for varying periods of time. One set from each type of stock was subjected immediately to physical tests in order to ascertain the tensile strength and elasticity thereof prior to aging. The second set of samples was subjected to a period of artificial aging or accelerated aging which was equivalent to a number of years of natural aging. Those samples prepared in accordance with Formula A were subjected to what is termed a low temperature test in which the samples were placed in an oxygen bomb under pressure of 150 pounds per square inch for a period of six days at a temperature of 150° C. The second set of samples were subjected to what is termed a high temperature test in which they were placed in a bomb filled with air under a pressure of 80 pounds per square inch and subjected to a temperature of 114° C. for a period of 7 hours. At the conclusion of these periods of artificial aging, the samples were removed from the bomb and subjected to physical tests corresponding to those conducted upon the unaged samples.

The results of these various tests are tabulated as follows:

LOW TEMPERATURE TEST

*Stock A*

| Cure | | Stress in kgs/cm² at | | | Elong. at break | Per cent weight increase |
|---|---|---|---|---|---|---|
| Time in mins. | Temp. F° | 500% elong. | 700% elong. | Break | | |

*Mono beta naphthyl benzidine*
*Original*

| 35 | 285 | 20 | 56 | 128 | 860 | |
| 50 | 285 | 25 | 82 | 162 | 815 | |
| 70 | 285 | 35 | 129 | 186 | 765 | |

*Aged 6 days in oxygen bomb*

| 35 | 285 | 19 | 64 | 116 | 805 | |
| 50 | 285 | 25 | 92 | 135 | 765 | |
| 70 | 285 | 34 | 133 | 57 | 725 | |

*s. Di-beta naphthyl benzidine*
*Original*

| 35 | 285 | 18 | 52 | 112 | 845 | |
| 50 | 285 | 21 | 67 | 128 | 815 | |
| 70 | 285 | 28 | 100 | 146 | 765 | |

*Aged 6 days in oxygen bomb*

| 35 | 285 | 18 | 58 | 118 | 835 | .12 |
| 50 | 285 | 24 | 81 | 135 | 795 | .22 |
| 70 | 285 | 29 | 107 | 130 | 735 | .31 |

HIGH TEMPERATURE TEST

*Stock B*

| | | 300% | 500% | | | |
|---|---|---|---|---|---|---|

*Mono beta naphthyl benzidine*
*Original*

| 35 | 285 | 39 | 104 | 200 | 670 | |
| 50 | 285 | 47 | 123 | 228 | 650 | |
| 70 | 285 | 52 | 133 | 228 | 645 | |

*Aged 7 hours in air bomb*

| 35 | 285 | 32 | 72 | 87 | 560 | |
| 50 | 285 | 44 | 95 | 138 | 610 | |
| 70 | 285 | 48 | 104 | 121 | 550 | |

*s. Di-beta naphthyl benzidine*
*Original*

| 35 | 285 | 36 | 100 | 158 | 610 | |
| 50 | 285 | 40 | 112 | 176 | 610 | |
| 70 | 285 | 45 | 120 | 208 | 640 | |

*Aged 7 hours in air bomb*

| 35 | 285 | 14 | -------- | 40 | 490 | |
| 50 | 285 | 19 | -------- | 52 | 510 | |
| 70 | 285 | 22 | -------- | 66 | 530 | |

It will be apparent that those materials containing either the mono or dinaphthyl substituted benzidine resisted the attacks of oxygen and heat even under the comparatively severe conditions existing in the bomb and retained a large portion of their tensile strength and elasticity under conditions which would have reduced stocks containing no antioxidants to resinous masses substantially devoid of tensile strength and elasticity. As previously intimated, these new types of antioxidants, in addition to being highly effective as age retarders, are also comparatively inexpensive to manufacture and are neither odorous or toxic in nature. For that reason, they may be employed in factories without any unusual or extensive precautions in order to overcome odors or to prevent undesirable physiological effects upon the workmen employed in handling them.

Although I have described but the preferred forms of the invention, it will be apparent to those skilled in the art that the invention is not so limited but that various modifications may be made therein without departing from the spirit of the invention or from the scope of the appended claims.

What I claim is:

1. A method of treating rubber which comprises incorporating therein a naphthyl substituted benzidine.

2. A method of treating rubber which comprises incorporating therein a dinaphthyl substituted benzidine.

3. A method of treating rubber which comprises subjecting it to vulcanization in the presence of a naphthyl substituted benzidine.

4. A method of preserving rubber which comprises subjecting it to vulcanization in the presence of a dinaphthyl substituted benzidine.

5. A method of preserving rubber which comprises subjecting it to vulcanization in the presence of a material having the formula

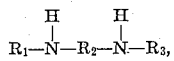

in which $R_1$ and $R_3$ are naphthyl radicals and $R_2$ is a dephenyl nucleus.

6. A method of preserving rubber which comprises subjecting it to vulcanization in the presence of a material having the formula

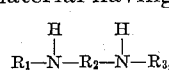

in which $R_1$ and $R_3$ are naphthylene groups and $R_2$ is a material selected from a group consisting of diphenyl and methyl substituted diphenyl.

7. A method of preserving rubber which comprises subjecting it to vulcanization in the presence of a naphthyl substituted material selected from a class consisting of benzidine and methyl substituted benzidine.

8. A method of preserving rubber which comprises subjecting it to vulcanization in the presence of a material selected from a group consisting of di-beta naphthyl substituted benzidine and di-beta naphthyl substituted tolidine.

9. A method of preserving rubber which comprises subjecting it to vulcanization in the presence of di-beta naphthyl substituted benzidine.

10. A rubber product that has been vulcanized in the presence of a naphthyl substituted derivative of the benzidine group.

11. A method of preserving rubber which comprises subjecting it to vulcanization in the presence of a naphthyl substituted material selected from a class consisting of benzidine and methyl substituted benzidine.

12. A rubber product that has been vulcanized in the presence of a material having the formula

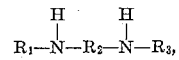

in which $R_1$ and $R_3$ are naphthyl groups and $R_2$ is a diphenyl radical.

In witness whereof, I have hereunto signed my name.

Signed at Akron, in the county of Summit and State of Ohio, U. S. A., this 28th day of May, 1930.

ALBERT M. CLIFFORD.